United States Patent
Scoggins et al.

(10) Patent No.: US 8,226,360 B2
(45) Date of Patent: Jul. 24, 2012

(54) CRENELATED TURBINE NOZZLE

(75) Inventors: Patrick Jarvis Scoggins, Loveland, OH (US); James Harvey Laflen, Cincinnati, OH (US); Ching-Pang Lee, Cincinnati, OH (US); Wilson Frost, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 796 days.

(21) Appl. No.: 12/262,437

(22) Filed: Oct. 31, 2008

(65) Prior Publication Data

US 2010/0111682 A1    May 6, 2010

(51) Int. Cl.
*F01D 1/02*    (2006.01)
(52) U.S. Cl. ....................................... 415/191
(58) Field of Classification Search .................... 415/191
See application file for complete search history.

(56) References Cited

U.S. PATENT DOCUMENTS

| | | |
|---|---|---|
| 3,300,180 A | 1/1967 | Tuttle et al. |
| 3,302,926 A | 2/1967 | Bobo |
| 5,474,419 A | 12/1995 | Reluzco et al. |
| 5,752,804 A | 5/1998 | Benoist et al. |
| 5,797,725 A | 8/1998 | Rhodes |
| 6,183,192 B1 | 2/2001 | Tressler et al. |
| 6,425,738 B1 | 7/2002 | Shaw |
| 6,464,457 B1 | 10/2002 | Morgan et al. |
| 6,488,469 B1 | 12/2002 | Youessef et al. |
| 6,742,987 B2 | 6/2004 | Correia et al. |
| 2006/0127215 A1 | 6/2006 | Durocher et al. |
| 2007/0154316 A1* | 7/2007 | Clarke ............... 416/223 R |
| 2010/0158678 A1* | 6/2010 | Bielek et al. ............. 415/193 |
| 2011/0052381 A1* | 3/2011 | Hoke et al. ............... 415/191 |
| 2011/0123322 A1* | 5/2011 | Allen-Bradley et al. ...... 415/191 |

FOREIGN PATENT DOCUMENTS

| | | |
|---|---|---|
| EP | 0716219 A1 | 6/1996 |
| EP | 1340885 A2 | 9/2003 |
| EP | 1795712 A2 | 6/2007 |
| WO | 2009085620 A1 | 7/2009 |

OTHER PUBLICATIONS

International Search Report issued in connection with corresponding PCT Application No. PCT/US2009/057374 on May 25, 2010.
Pratt & Whitney Canada, "Status Report-PW500 Turbofan Engine Family," 2 pgs; 2 pg Product and Overview; and PW530 engine photo and enlargement, in public use or on sale or known by others in USA more than one year before Oct. 1, 2008.

* cited by examiner

*Primary Examiner* — Stephen W Smoot
*Assistant Examiner* — Robert Bachner
(74) *Attorney, Agent, or Firm* — David J. Clement; Trego, Hines & Ladenheim, PLLC

(57) ABSTRACT

A turbine nozzle includes a row of vanes extending radially between annular outer and inner bands. The outer band includes a pair of radial flanges defining an annular seal groove therebetween. One of the flanges is crenelated to improve nozzle life.

26 Claims, 7 Drawing Sheets

CRENELATED TURBINE NOZZLE

BACKGROUND OF THE INVENTION

The present invention relates generally to gas turbine engines, and, more specifically, to turbine nozzles therein.

In a gas turbine engine, air is pressurized in a compressor and mixed with fuel in a combustor for generating hot combustion gases. The combustion gases are discharged from the combustor through a first stage turbine nozzle that channels the combustion gases into a row of turbine rotor blades which extract energy therefrom for powering the compressor.

The high pressure turbine (HPT) may have one or more turbine stages and is typically followed by a multistage low pressure turbine (LPT) that extracts additional energy from the combustion gases for powering an upstream fan in the typical turbofan aircraft engine configuration.

Since the first stage turbine nozzle first receives the high temperature combustion gases from the combustor it is subject to an extremely hostile operating environment that affects the useful life thereof. The nozzle components are typically formed from superalloys having enhanced strength at the experienced elevated temperatures of operation for maximizing useful life.

The turbine nozzle is subject to various pressure and thermal loads during operation which also effect corresponding stresses in the various components which stresses also affect nozzle life.

Since the nozzle thermally expands as it is heated by the combustion gases, and correspondingly thermally contracts as its temperature is reduced during the various operating cycles of the engine, substantial thermal loads and stresses are created in the nozzle. The thermal stresses therefore cycle in magnitude with the periodic operating cycles of the engine and its nozzle.

Accordingly, the life of the turbine nozzle itself is measured in operating cycles and is dependent upon the specific design of the turbine nozzle.

For example, typical turbine nozzles in large turbofan engines are circumferentially segmented into one or more vane segments to interrupt the circumferential continuity of the annular outer and inner bands which integrally support the corresponding turbine nozzle vanes therebetween.

Fully annular or unsegmented nozzle bands have increased strength and rigidity but correspondingly restrain expansion and contraction of the rigid nozzle vanes extending radially therebetween. Accordingly, significant thermal stresses are generated at the radial ends of the vanes where they integrally join their corresponding outer and inner bands.

Thermal restraint as well as structural rigidity are correspondingly reduced by circumferentially segmenting the nozzle bands, which correspondingly increases the complexity of the design by requiring suitable spline seals between the segmented bands.

A nozzle having a row of vane singlets has maximum segmentation of the bands with a single vane being integrally mounted to correspondingly short outer and inner band segments.

A nozzle having vane doublets includes two vanes integrally mounted in common band segments with correspondingly fewer segments around the perimeter.

And nozzle triplets are also known in which three vanes are integrally grouped to corresponding band segments for further reducing the segmentation of the bands.

However, as the number of vanes in each band segment increases, the significant problem of thermal restraint of the individual vanes also increases, with an associated increase in thermal stress where the vanes meet the integral bands.

Adding to the complexity of the design of modern turbine nozzles, is their mounting configuration in the engine itself. The nozzle is a fully annular assembly of components and must be suitably supported in the engine at the outlet end of the annular combustor with minimal thermal restraint that would otherwise add to the loads and stresses experienced by the nozzle.

Accordingly, the nozzle includes various flanges integrally formed in the inner and outer bands thereof, which flanges are used for mounting and sealing the nozzle in the engine, but which flanges also increase the structural rigidity of the nozzle and the corresponding thermal restraint.

The prior art is therefore replete with various forms of turbine nozzles having correspondingly different designs for use in correspondingly different gas turbine engines ranging in size and power from small to large for different aircraft and industrial applications.

In one conventional design of a small aircraft engine, a fully annular or unitary turbine nozzle is used without any circumferential segmentation of its outer and inner bands for reducing the structural complexity thereof, but at the expense of nozzle life.

The inner band includes a middle mounting flange, with the outer band including two pairs of circumferentially continuous flanges defining forward and aft annular grooves. Expansion seals in the form of split piston rings are trapped in the grooves and extend radially outwardly in sealing abutment with corresponding annular seal lands.

In this way, the unitary turbine nozzle is fixedly mounted in the engine from its inner band, with the outer band being allowed to freely expand and contract radially while the ring seals seal the pressurized gases.

However, operating experience has shown that this type of turbine nozzle has a finite useful life substantially less than that typically found for segmented turbine nozzles. And, in a present development program, it is desired to substantially increase the useful life of this type of nozzle for reducing maintenance outages and operating costs.

Accordingly, it is desired to provide a unitary turbine nozzle having reduced thermal stress for increasing useful life.

BRIEF DESCRIPTION OF THE INVENTION

A turbine nozzle includes a row of vanes extending radially between annular outer and inner bands. The outer band includes a pair of radial flanges defining an annular seal groove therebetween. One of the flanges is crenelated to improve nozzle life.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
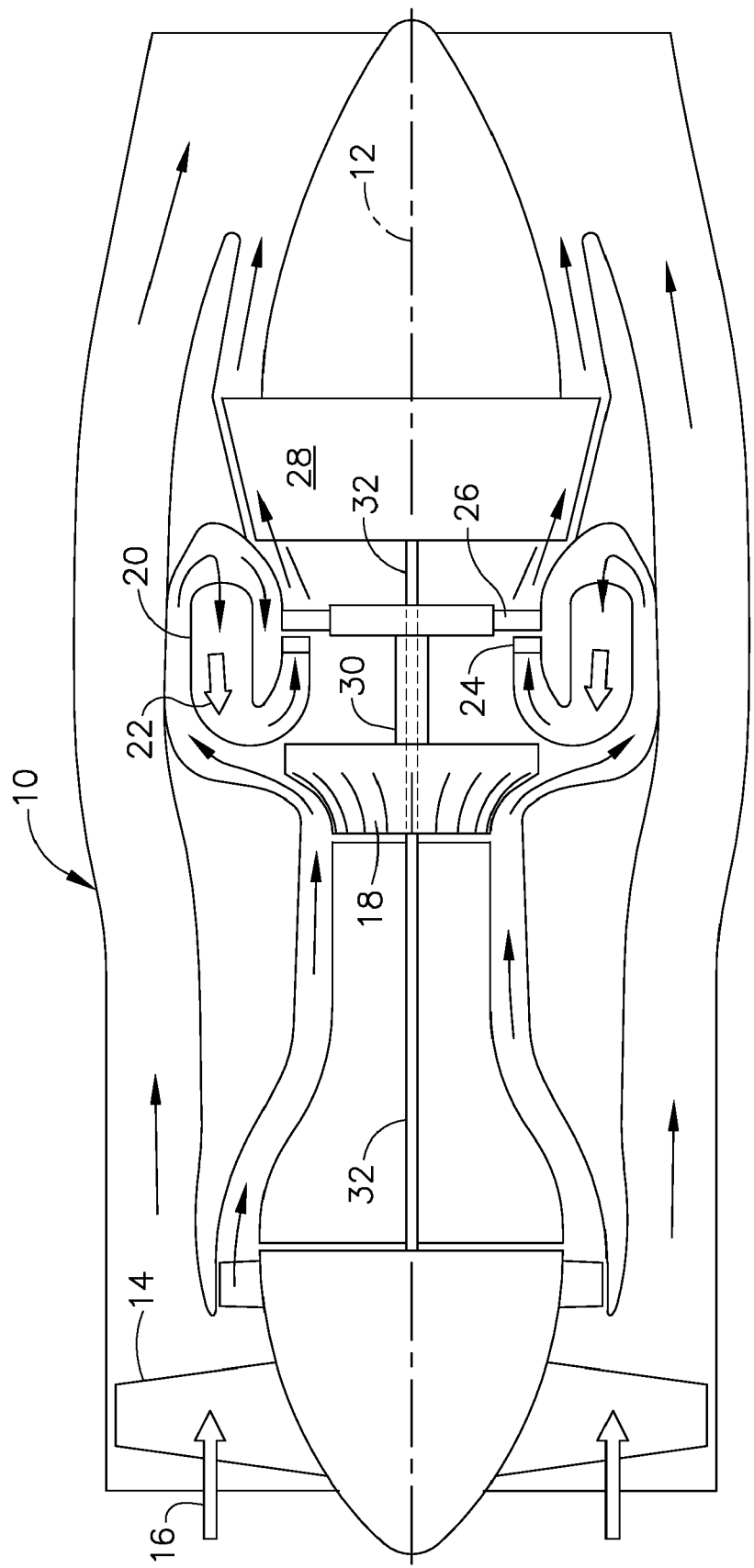
FIG. 1 is schematic axial view of axisymmetrical turbofan aircraft engine.

Illustrated schematically in FIG. 1 is a turbofan aircraft gas turbine engine 10 which is axisymmetrical about a longitudinal or axial centerline axis 12. The engine includes a fan 14 at its forward end which receives ambient air 16.

The air 16 is initially pressurized by the rotor blades of the fan 14 and channeled downstream to a centrifugal compressor 18 that further pressurizes the air.

The pressurized compressor air is then channeled axially downstream into an annular combustor 20 wherein the air is mixed with fuel and ignited for generating hot combustion gases 22. The exemplary combustor 20 illustrated in FIG. 1 is a reverse flow combustor in which the pressurized compressor air is initially channeled to the aft end of the combustor wherein it reverses direction upstream for generating the combustion gases therein, with the combustor being configured to again reverse direction of the combustion gases into the axially downstream direction in a conventional configuration.

The hot combustion gases 22 are discharged from the outlet end of the combustor through an annular first stage turbine nozzle 24 which is axisymmetrical about the centerline axis 12.

The turbine nozzle 24 discharges the combustion gases into a row of first stage turbine rotor blades 26 extending radially outwardly from a supporting rotor disk. The turbine nozzle 24 and rotor blades 26 define a single stage high pressure turbine (HPT).

The combustion gases as discharged from the turbine blades 26 in the axial downstream direction into a corresponding low pressure turbine (LPT) 28 which may have three corresponding stages for example. Each stage of the LPT 28 includes a corresponding stator nozzle followed in turn by a row of low pressure turbine rotor blades.

During operation, energy is extracted from the combustion gases 22 by the HPT blades 26 with their supporting disk being joined by a first drive shaft 30 to the centrifugal compressor 18 for providing energy thereto. Further energy is extracted from the combustion gases in the LPT 28 whose rotors are joined by a second drive shaft 32 disposed coaxially through the first drive shaft and extending axially forward to drive the upstream fan 14.

The exemplary engine illustrated in FIG. 1 typically has a relatively small size and power output, with the centrifugal form of the compressor 18 having sufficient capacity for pressurizing the volume of air required for the intended power output. This type of small engine is in contrast with the substantially larger high bypass turbofan aircraft engines which include a large number of stages in the axial compressor thereof for pressurizing the air to substantially higher pressures and volumes than that capable in the centrifugal compressor.

Figure 2:
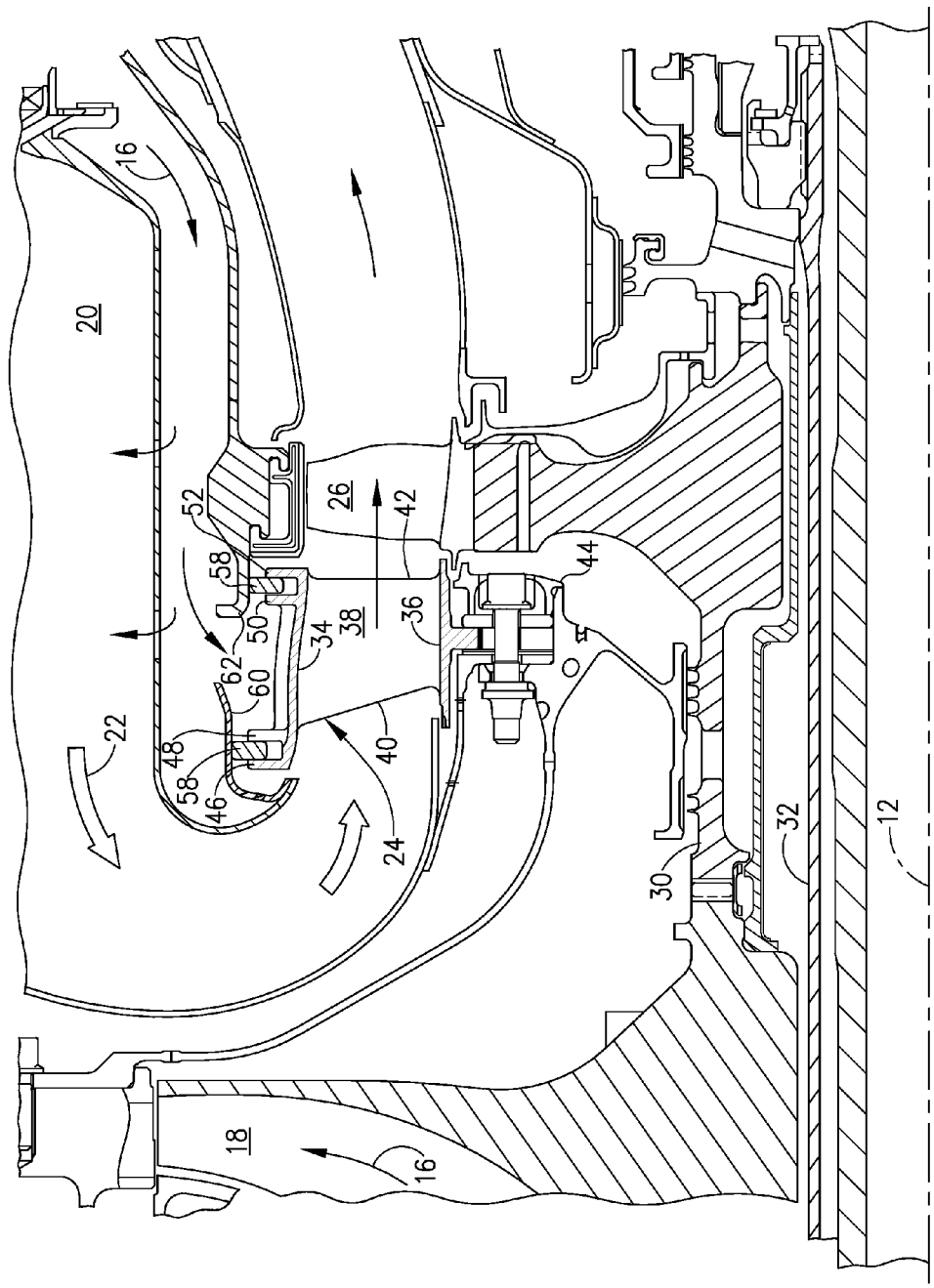
FIG. 2 is an enlarged axial sectional view of the HPT in the engine illustrated in FIG. 1.

FIG. 2 illustrates an enlarged view of the outlet end of the reverse flow annular combustor 20 which discharges the hot combustion gases 22 into the annular turbine stator nozzle 24 for in turn flow axially downstream through the row of first stage turbine blades 26.

Figure 3:
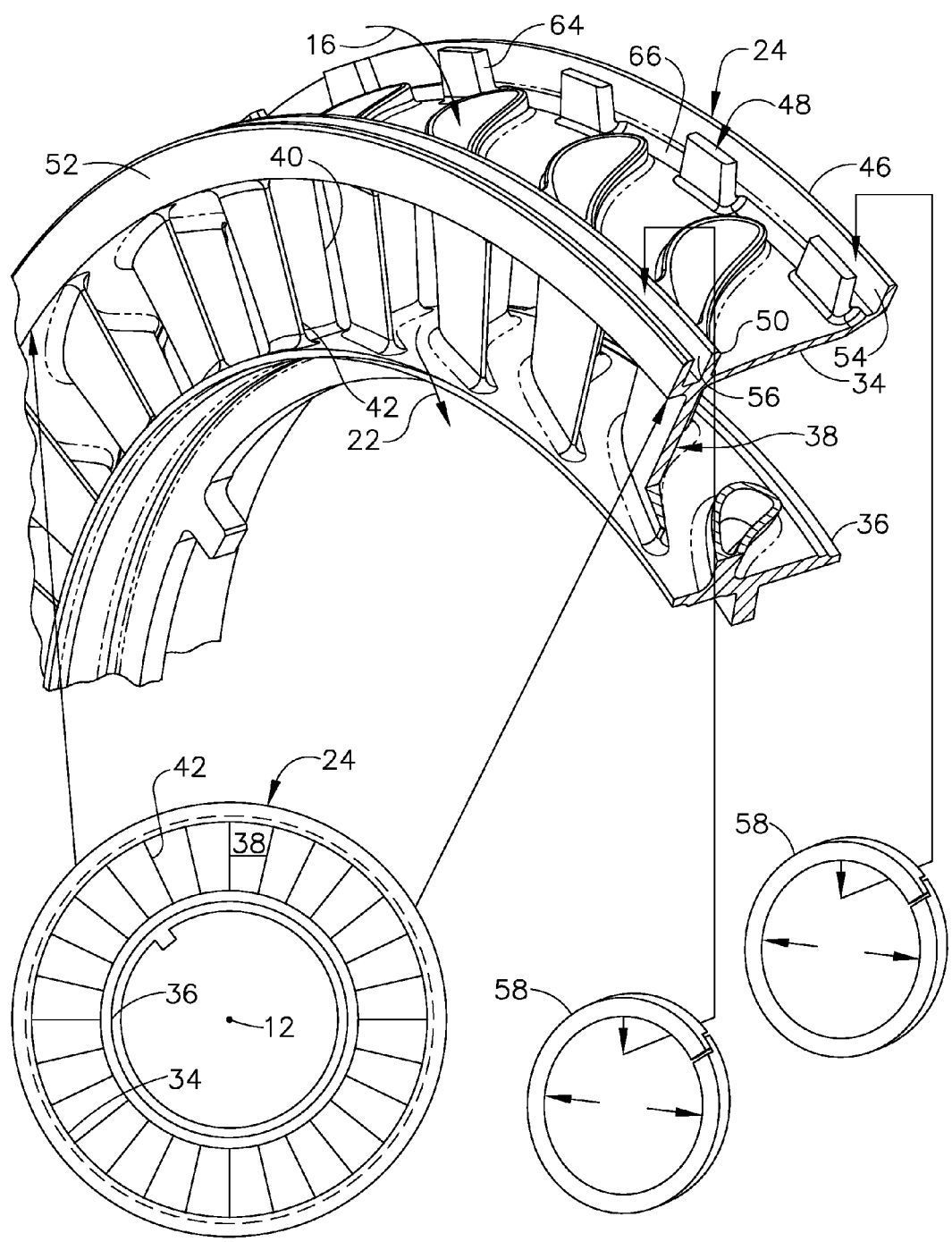
FIG. 3 is a schematic, isolated view of the nozzle in the HPT illustrated in FIG. 2.

As best illustrated in FIG. 3, the first stage turbine nozzle 24 is a unitary and fully annular component having a circumferentially continuous radially outer band 34 and a circumferentially continuous radially inner band 36 between which extend a row of hollow nozzle stator vanes 38.

The outer and inner bands 34,36 are fully annular, without circumferential segmentation, and are integrally joined to the opposite radial ends of the row of vanes 38 which are circumferentially spaced apart from each other around the perimeter or circumference of the nozzle. The nozzle may be formed in any suitable manner to effect the unitary or one-piece assembly thereof.

For example, the outer and inner bands 34,36 may be separately manufactured or cast as complete rings. The individual nozzle vanes 38 may be separately cast. And the bands and vanes may be formed of suitable superalloy metal for withstanding the high temperature environment of the engine, with the vanes being suitably brazed to the corresponding bands in a conventional manner.

The vanes 38 themselves are preferably hollow with thin metal walls having the typical crescent or airfoil configuration with a leading edge 40 at the upstream or forward end of the nozzle and bands, and corresponding axially opposite trailing edges 42 at the aft end of the nozzle and bands.

In the exemplary embodiment illustrated in FIG. 3, each of the hollow vanes 38 extends radially through a corresponding aperture in the outer band 34 for receiving therethrough during operation compressor discharge air for internally cooling the vanes.

The vanes may have any conventional cooling configuration including one or more impingement baffles in the central chamber thereof for internally cooling each vane, with the vanes typically having various rows of film cooling holes disposed through the sidewalls thereof for discharging the spent cooling air for film cooling the external surfaces of the vanes.

The annular nozzle 24 is suitably mounted in the engine as illustrated in FIG. 2. For example, the inner band 36 includes a radially inwardly extending middle mounting flange suitably trapped in the corresponding annular groove of a stationary nozzle mount 44. The mount 44 has a conventional configuration including an annular retainer ring secured by a row of retention bolts to an annular frame to define the retention groove therebetween.

As initially illustrated in FIGS. 2 and 3, the outer band 34 has a smooth inner surface facing radially inwardly to confine the hot combustion gases flowing between the vanes during operation. The outer band is a suitably thin annular plate, and includes forward and aft pairs of flanges 46,48,50,52 extending radially outwardly from the outer surface of the outer band 34 and integral therewith.

The first and second flanges 46,48 of the forward flange pair extend radially outwardly at the forward or upstream end of the outer band to define a corresponding forward annular seal groove or seat 54.

The third and fourth flanges 50,52 of the aft flange pair extend radially outwardly from the aft end of the outer band to define an aft annular seal groove 56.

Figure 4:
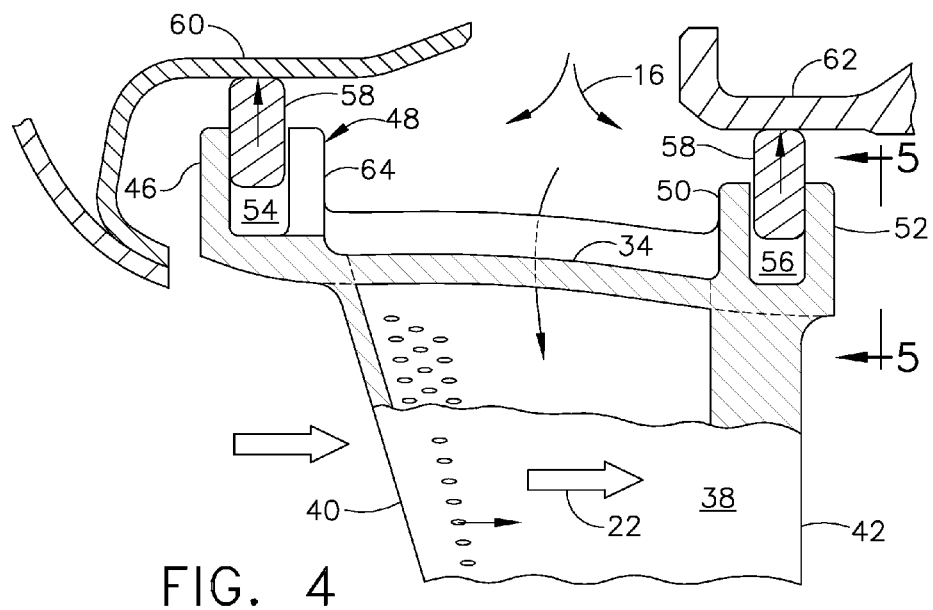
FIG. 4 is an enlarged axial sectional view of the outer band portion of the turbine nozzle illustrated in FIGS. 2 and 3 in accordance with one embodiment.

As best illustrated in FIG. 4, the first flange 46, the second flange 48, the third flange 50, and the fourth flange 52 are arranged in downstream numerical sequence between the forward and aft ends of the outer band 34 corresponding with the leading and trailing edges 40,42 of the vanes 38. The forward flange pair 46,48 and the annular groove 54 therebetween are disposed at the forward end of the outer band 34 cantilevered upstream from and terminating closely adjacent to the vane leading edges 40.

In contrast, the aft pair of flanges 50,52 and the corresponding groove 56 therebetween, are disposed at the aft end of the outer band directly above the solid trailing edge portion of the vanes 38. It is noted that each vane 38 as illustrated in FIG. 3 first increases in width in the downstream direction from its leading edge and then decreases in width as it tapers to the relatively thin trailing edge. The internal cooling chamber or plenum of the hollow vane terminates upstream from the thin trailing edge to ensure suitable width for receiving the impingement baffle or other cooling features desired therein.

The two annular seal grooves 54,56 illustrated in FIG. 4 face or open radially outwardly and correspondingly receive structurally similar or identical first and second expansion seal rings 58.

The first or forward expansion ring 58 extends radially outwardly from the forward groove 54 in part radially above the locally forward and aft flanges 46,48, and is radially spaced above the outer band 34. The forward ring 58 is therefore trapped in lower part inside the forward groove 54, with its outer part extending suitably outwardly above the two flanges 46,48 which preferably have a common radial height.

The second or aft expansion ring 58 is similarly disposed in the aft groove 56 between the third and fourth flanges 50,52. The aft ring 58 again is trapped in lower part inside the aft groove 56 and is spaced radially above the outer band. And, the outer portion of the aft ring 58 extends radially outwardly above the two flanges 50,52 which also have a common radial height.

As initially shown in FIG. 2, the casing of the combustor 20 terminates just upstream of the nozzle outer band 34 and includes an integral extension in the form of an annular forward land 60 disposed concentrically around the forward pair of flanges 46,48 and against which the forward expansion ring 58 provides an abutting contact seal.

Similarly, the turbine casing commences around the aft end of the outer band 34 with an annular aft land 62 disposed concentrically around the corresponding aft two flanges 50,52 and against which the aft expansion ring 58 provides another abutting contact seal.

During operation, the pressurized compressor discharge air 16 is channeled around the combustor and is distributed into an open plenum surrounding the outer band of the nozzle for flow through the outer band into the corresponding nozzle vanes 38.

As better illustrated in FIG. 4, the pressurized compressor air 16 pressurizes the supply plenum between the outer band 34 and the two sealing lands 60,62 and also acts against the forward and aft seal rings 58.

These two seal rings 58 provide effective contact seals between their radially outer perimeter surfaces and the corresponding inner surfaces of the two lands 60,62 to prevent or minimize leakage of the pressurized air into the combustion gas flowpath.

Furthermore, the forward ring 58 is pressurized forward against the aft surface of the first flange 46 to provide a lateral abutting contact seal therewith. Similarly, the aft seal ring 58 is pressurized aft against the forward surface of the fourth flange 52 to provide another laterally adjoining contact seal therebetween.

The two expansion rings 58 typically include a single split in the circumferential continuity thereof with a suitable lateral lap joint therebetween, and initially oversized in diameter.

In this way, the free outer diameter of the rings 58 may initially be slightly larger than the inner diameter of the two lands 60,62 so that the rings may be initially elastically compressed to smaller diameter for assembly inside the corresponding annular lands 60,62 so that an elastic expansion force remains in each ring to urge the rings radially outwardly in constant contact with the two lands 60,62. This outward expansion force is represented in FIGS. 3 and 4, for example, by the diametric arrows.

The basic configurations of the forward and aft sealing grooves 54,56 and their expansion rings 58 are conventional, including fully annular and circumferentially continuous, 360-degree flanges 46,48,50,52. This configuration effects radially outer seals around the perimeters of the two rings 58. And, the forward ring 58 has a forward seal between the abutting lateral surfaces of the forward face thereof and the forward flange 46, with the aft ring 58 having an aft seal between the abutting lateral faces of the aft flange 52 and the aft ring.

However, the four sealing flanges 46-52 provide substantial structural rigidity to the thin outer band 34 in their circumferentially continuous configuration required for suitably trapping the two rings 48 with minimal side clearance to permit differential radial thermal expansion and contraction between the nozzle and the sealing lands 60,62.

Nevertheless, this basic nozzle design has enjoyed suitably long life in commercial service, but it is desired to increase the useful service life of the nozzle which in turn requires substantial improvements in the design.

However, the unitary turbine nozzle 24 is a highly complex and three-dimensional assembly of a multitude of hollow nozzle vanes integrally joined to the unitary outer and inner bands. Accordingly, the mechanical and thermal loads and stresses experienced by the nozzle are quite complex and inter-related.

In particular, the individual vanes 38 are rigidly joined at their radially outer and inner ends to the corresponding bands, and provide distributed radial loadpaths between the two bands during operation. The outer ends of the vanes are rigidly joined to the inner surface of the outer band 34, and necessarily cooperate with the four sealing flanges extending radially outwardly from the outer surface of the bands.

The forward pair of flanges 46,48 are cantilevered axially forward from the leading edges of the vanes. Whereas, the aft flanges 50,52 are disposed directly above the solid portion of the vane trailing edges.

The outer band 34 itself is relatively thin and flexible but locally strengthened and rigid where it joins each of the several vanes and where it joins each of the several sealing flanges.

The otherwise conventional turbine nozzle 24 disclosed above may be substantially improved for extending its useful life by preferentially castellating or crenelating at least one of the four sealing flanges 46-52 disclosed above for preferentially interrupting the circumferential continuity thereof, which continuity was previously required in the conventional design.

In view of the specific geometry of the outer band 34 illustrated in FIG. 4, a preferred embodiment for increasing nozzle life includes crenelation of the second flange 48 due to its close proximity adjacent to the leading edges of the vanes 38, with the forward pair of flanges 46,48 being cantilevered forwardly therefrom.

The crenelated second flange 48 may have any suitable configuration which interrupts the circumferential continuity of the flange into segmented portions. For example, the crenelated flange 48 preferably includes a common row of rectangular tabs or solid merlons 64 spaced circumferentially apart from each other by corresponding rectangular spaces or crenels 66.

Figure 5:
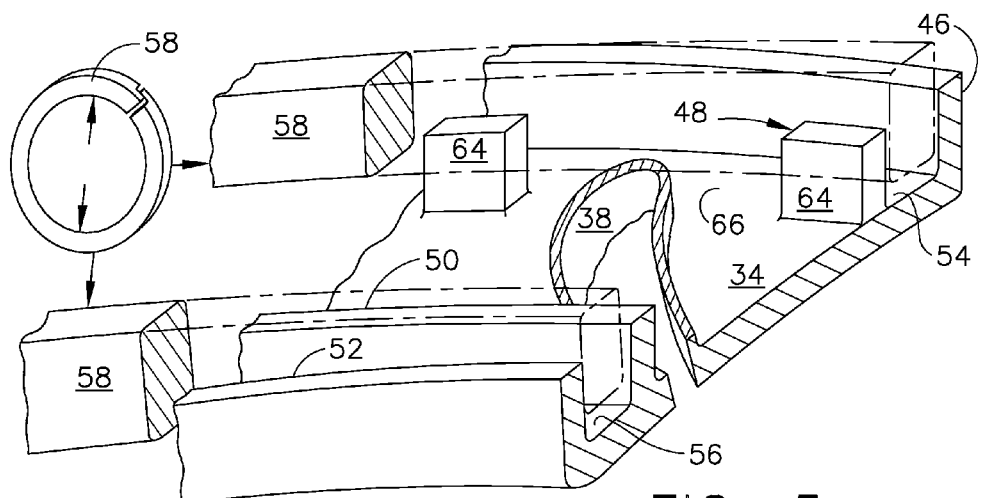
FIG. 5 is a forward-facing schematic view of a portion of the outer band illustrated in FIG. 4 and taken along line 5-5.

As best shown in FIG. 5, the merlons 64 are relatively tall and match the radial height of the cooperating first flange 46 and therefore begin in height at the outer surface of the outer band 34 and terminate in height at the same outer diameter as the first flange 46.

Correspondingly, the cooperating crenels 66 are also tall or full height and extend circumferentially along the outer surface of the band between adjacent merlons 64 over the full height of the merlons in the second flange 48.

The four flanges 46-52 may enjoy the benefit of their original designs and have minimum radial height and axial thickness as required for duly supporting the corresponding expansion rings 58 in accordance with their original design.

The preferential modification of the second flange 48 to introduce the crenel spaces 66 for interrupting the circumferential continuity of the flange locally reduces the structural rigidity of the outer band near the junctions of the vane leading edges and the band for substantially reducing local stresses thereat for increasing nozzle life.

As indicated above, each vane effects a locally rigid radial loadpath having locally high stresses with its juncture with the outer band, particularly near the leading and trailing edges of the vanes.

Preferentially crenelating the second flange 48 located closely adjacent to the vane leading edge locally reduces the structural rigidity of the outer band and in turn locally reduces stresses in the outer band.

Since a main function of the second flange 48 is to axially retain or trap the forward ring 58, it may be locally interrupted around its circumference while still providing its retention function.

In contrast, the forward flange 46 may retain its continuous circumferential configuration for maintaining its lateral seal in axial abutment with the forward ring 58.

As best illustrated in FIG. 3, the merlons 64 are preferably spaced circumferentially between corresponding pairs of the nozzle vanes 38, with one merlon 64 being spaced circumferentially equidistantly between the leading edges of directly adjacent vanes. In this way, the local increase in structural rigidity due to the individual merlons 64 themselves is located in the outer band between adjacent vanes leaving the open space crenels 66 bridging the vane leading edge between merlons.

The structural rigidity between the thin outer band and each vane around its leading edge is therefore substantially reduced which correspondingly reduces the local stresses thereat during operation, which in turn leads to increased nozzle life.

In the exemplary embodiment illustrated in FIG. 3, the nozzle includes a full complement of twenty eight vanes 38 spaced apart circumferentially around the perimeter thereof, with the number of merlons 64 preferably matching in quantity, twenty eight, the number of vanes in the nozzle in a one-to-one arrangement.

This configuration suitably isolates the individual merlons 64 away from the leading edge junctures of the vanes and outer band while also maintaining the retention capability of the second flange 48 for preferentially trapping the forward expansion ring 58. And, since the expansion ring 58 has the split lap joint in its perimeter, the close spacing of adjacent merlons 64 ensures effective lateral or axial retention of the split-ring 58 without unacceptable separation of the lap joint itself due to lateral bending.

Each merlon 64 is preferably rectangular in configuration as disclosed above and has a radial height matching that of the cooperating first flange 46. Otherwise, the circumferential width and axial thickness of each merlon 64 may be suitably designed for minimizing added rigidity of the outer band while maintaining the retention function of the segmented second flange 48 by its merlons 64.

The embodiment illustrated in FIG. 4 includes only the crenelated second or aft flange 48 in the forward flange pair, with the remaining three flanges 46,50,52 retaining their original circumferential continuity. With this single change in design of the crenelated second flange 48, a substantial increase in nozzle life may be obtained, with the nozzle otherwise operating conventionally as originally designed.

However, further improvements in the design of the nozzle may be obtained with careful structural analysis thereof for addressing suitable changes in the remaining three flanges if practical. For example, analysis predicts a further reduction in local stresses at the junction of the vane trailing edges 42 and the outer band 34 when the aft or fourth flange 52 is also crenelated.

Note that although the four flanges 46-52 have similar configurations and similarly extend radially outwardly from the outer band, those four flanges nevertheless join the outer band 34 at its opposite axial ends in locally different junctions therewith and with locally different cooperation with the underlying nozzle vanes 38 including in particular their leading and trailing edges 40,42. The vane leading and trailing edges 40,42 effect corresponding local stress concentrations at their juncture with the outer bands.

Note in particular that although the fourth flange 52 at the vane trailing edges may be crenelated for locally reducing stresses, such crenelation interferes with the original sealing design of the aft expansion ring 58. Any circumferential interruptions in the aft flange 52 create local sites where the pressurized compressor air may leak, which leakage must be controlled for proper operation of the turbine nozzle.

Figure 7:
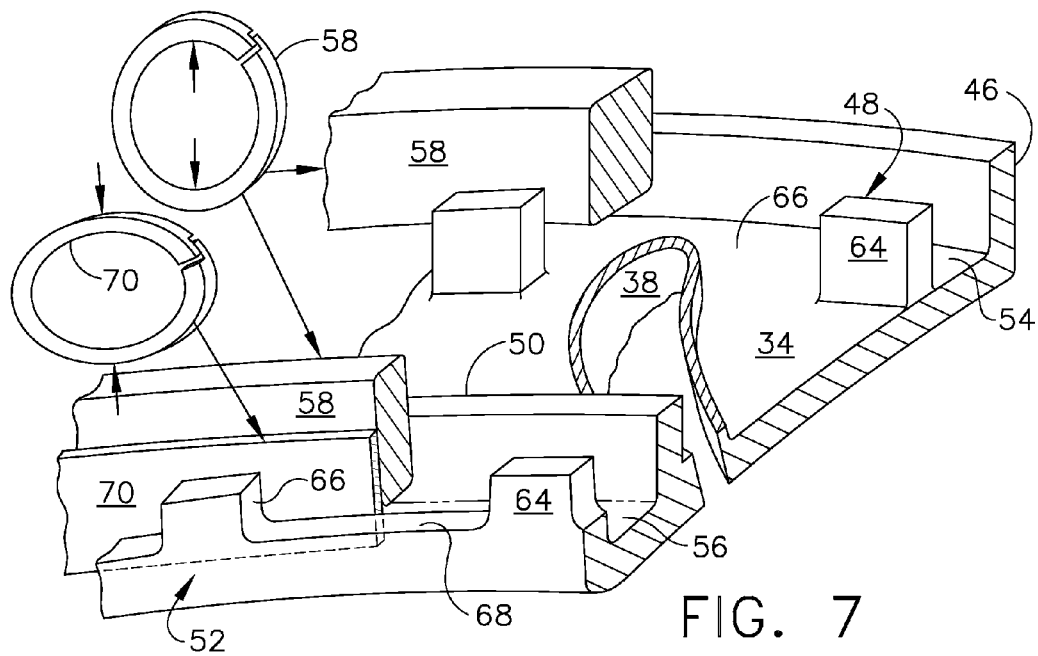
FIG. 7 is a forward-facing schematic view of a portion of the outer band illustrated in FIG. 6 and taken along line 7-7.
Figure 6:
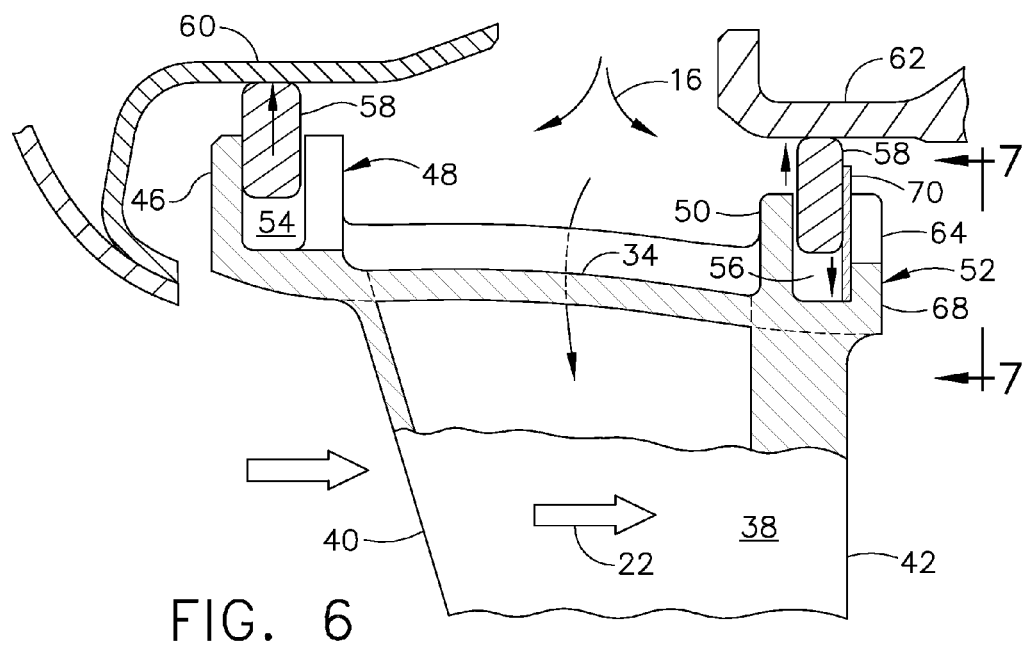
FIG. 6 is an enlarged axial sectional view of the outer band, like FIG. 4 illustrating another embodiment thereof.

FIGS. 6 and 7 illustrate a suitable form of the crenelated fourth flange 52 for resolving this sealing problem. In particular, the crenelated aft flange 52 includes an annular ridge or base 68 which is circumferentially continuous around the full 360 degree circumference of the outer band, which base 68 extends radially outwardly from the outer surface thereof.

In this configuration, the rectangular merlons 64 are relatively short and extend radially outwardly in integral width from the supporting base 68, with the correspondingly short crenels 66 extending circumferentially between the adjacent short merlons and above or along the top surface of the annular base 68.

In this configuration, the aft flange 52 is crenelated in part and provides a circumferentially scalloped retaining flange that retains full surface coverage along the bottom of the aft groove 56, while interrupting the circumferential continuity and rigidity of the aft flange around its perimeter.

In this configuration of the scalloped aft flange 52, a second annular seal in the form of a contraction ring 70 is disposed in the aft groove 56 laterally abutting the second expansion ring 58 also disposed therein. In this way, the contraction ring 70 is disposed axially between the expansion ring 58 and the crenelated fourth flange 52 to provide a secondary seal therewith that overlaps the open crenels 66 between the merlons.

As shown in FIG. 6, the second expansion ring 58 in the aft groove 56 operates as intended to provide a radially outer seal with the aft land 62 while also providing a secondary seal between its aft face and the additional contraction ring 70 which in turn provides another seal with the crenelated aft flange 52.

Furthermore, the contraction ring 70 preferably also has a lap joint junction in its perimeter and is initially undersized in diameter. The ring 70 is initially elastically expanded in diameter for mounting in the aft groove 56, and the resulting residual elastic loads will contract the ring 70 radially inwardly so that its inner diameter provides another contact seal with the outer surface of the outer band in the aft groove, with the inner aft surface of the ring 70 also providing a contact seal along the forward face of the annular base 68. The inward contraction force is represented in FIG. 7 by the diametric arrows.

FIG. 7 illustrates schematically the radially outward or outbound residual loads in the expansion ring 58 for providing outward seating thereof with the corresponding lands 60,62. Correspondingly, the radially inward or inbound residual loads in the contraction ring 70 are also illustrated schematically to ensure inward seating thereof in the aft groove 56.

Accordingly, the aft flange 52 may be crenelated in part for reducing structural rigidity of the outer band around the vane trailing edges, with the secondary contraction ring 70 being introduced into the aft groove 56 for cooperating with the expansion ring 58 to collectively effect suitable sealing during operation.

The relative dimensions of the expansion ring 58 and cooperating contraction ring 70 in the common aft groove 56 may be selected as desired for withstanding the operating environment of the nozzle. The contraction ring 70 is illustrated as being thinner than the expansion ring 58 but may have the same or similar thickness suitably accommodated by increasing the width of the aft groove 56 if desired.

Both the forward and aft grooves 54,56 are sized in axial width to be a few mils wider than the widths of the sealing rings mounted therein to permit free expansion and contraction of the nozzle outer band without undesirable frictional restraint by the sealing rings. And, the various flanges 46-52 retain sufficient radial height for retaining the corresponding sealing rings over the intended differential radial travel between the outer band and the sealing lands 60,62, while also providing effective lateral sealing with the rings.

Figure 9:
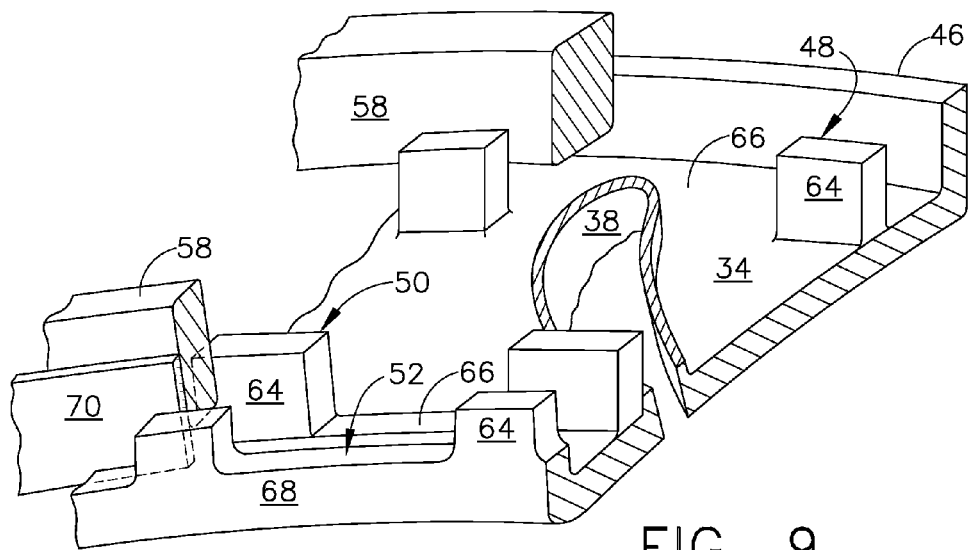
FIG. 9 is a forward-facing schematic view of a portion of the outer band illustrated in FIG. 8 and taken along line 9-9.
Figure 8:
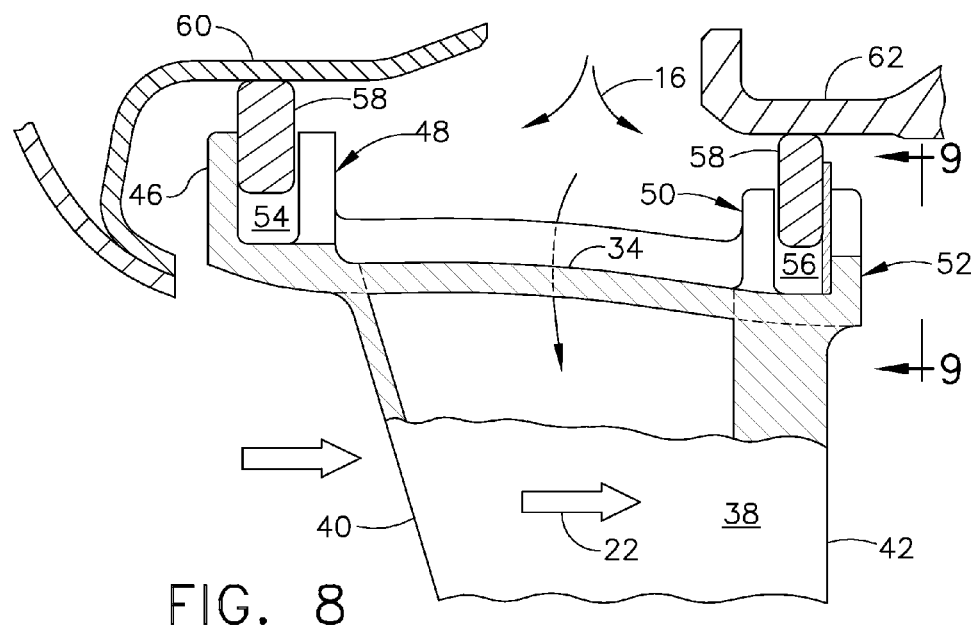
FIG. 8 is an enlarged axial sectional view of the outer band, like FIG. 4 illustrating another embodiment thereof.

FIGS. 8 and 9 illustrate yet another embodiment including the crenelated second and fourth flanges 48,52 initially illustrated in FIGS. 4-7, but including in addition a suitably crenelated third flange 50.

Like the FIG. 4 embodiment, the third flange 50 is crenelated using the tall merlons 64 which begin at the outer surface of the outer band 34, with the corresponding tall crenels 66 extending circumferentially along the outer surface of the band between the adjacent merlons 64.

The full depth crenels 66 may be utilized at the third flange 50 since the function of this flange is to retain the aft expansion ring 58 without any requirement for sealing. As indicated above, sealing in the aft groove 66 occurs both at the radial perimeter of the expansion ring 58 and its axially aft surface, and not its axially forward surface which is typically spaced from the third flange 50.

Whereas the crenelated fourth flange 52 reduces structural rigidity around the outer band over the vane trailing edges, crenelation of the third flange 50 also reduces structural rigidity thereof in combination with the aft flange 52.

Note that in FIG. 8 both flanges 50,52 are located directly atop the solid portion of the thin trailing edges 42 of the row of vanes and thusly provide corresponding loadpaths therebetween. Analysis suggests that the use of the crenelated third flange 50 by itself with the remaining three flanges being circumferentially continuous will undesirably increase the local stresses in the junction between the vane trailing edges and the outer band and correspondingly reduce nozzle life.

Accordingly, the various sealing flanges 46-52 surrounding the nozzle outer band 34 may be crenelated only preferentially, depending upon their relative axial location in the turbine nozzle and relative to the underlying location of the nozzle vanes. Corresponding stress analysis for specific nozzle designs may therefore be used to determine which of the several radial flanges may be effectively crenelated for decreasing, and not undesirably increasing, local stresses for increasing useful life of the nozzle.

Figure 11:
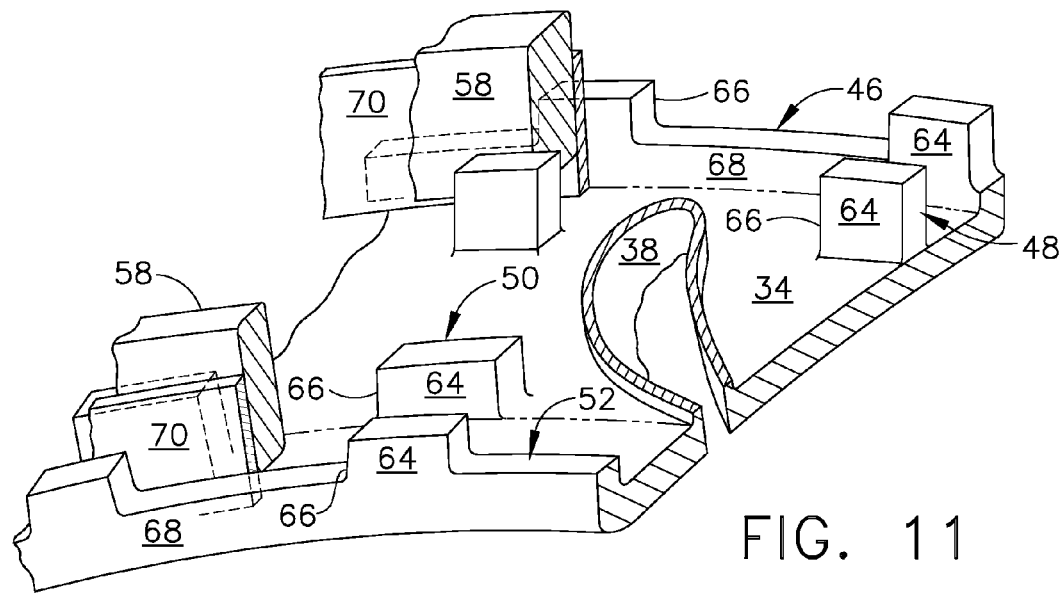
FIG. 11 is a forward-facing schematic view of a portion of the outer band illustrated in FIG. 10 and taken along line 11-11.
Figure 10:
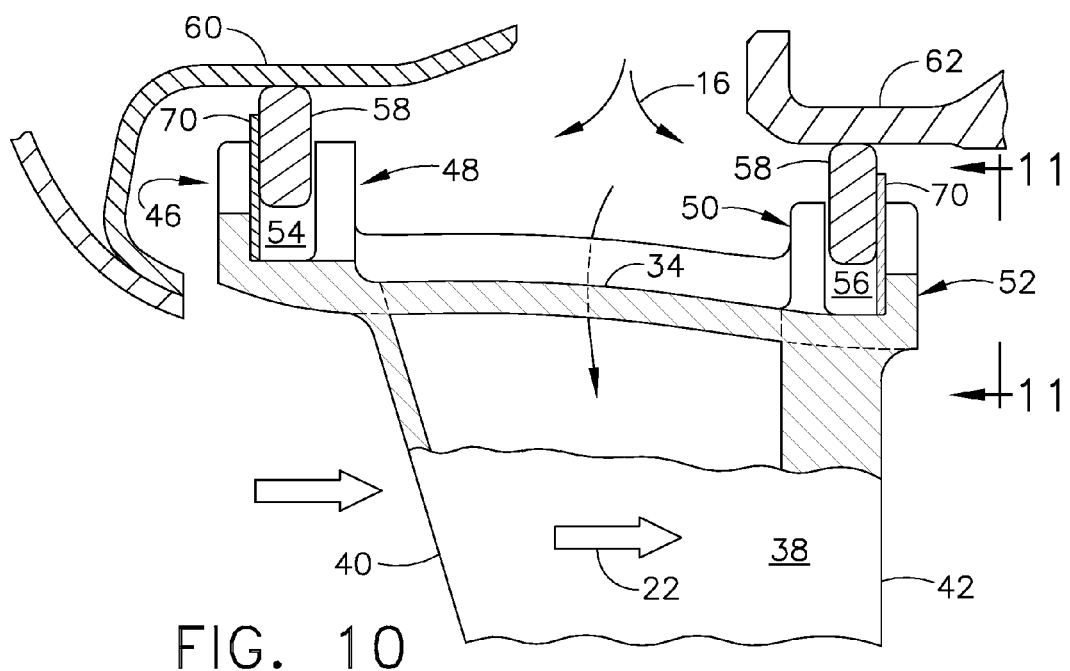
FIG. 10 is an enlarged axial sectional view of the outer band, like FIG. 4 illustrating another embodiment thereof.

FIGS. 10 and 11 illustrate yet another embodiment of the turbine nozzle in which all four sealing flanges 46-52 are suitably crenelated, including also the first or forward flange 46.

Accordingly, the second flange 48 is crenelated in the same manner illustrated in FIGS. 4 and 5.

The fourth flange 52 is crenelated in the same manner illustrated in FIGS. 6 and 7, and the aft groove 56 includes both the aft expansion ring 58 and the aft contraction ring 70.

The third flange 50 is crenelated in the same manner illustrated in FIGS. 8 and 9.

And, the first flange 46 illustrated in FIGS. 10 and 11 is crenelated in the same manner as the aft flange 52 illustrated in FIGS. 6 and 7.

In particular, the crenelated first flange 46 includes the annular base 68 extending radially outwardly from the outer band 34 with the short merlons 64 extending radially outwardly from that base 68, with the corresponding short crenels 66 extending circumferentially between adjacent short merlons and along or atop the supporting annular base 68.

Correspondingly, the forward groove 54 includes both the first expansion ring 58 and a laterally abutting contraction ring 70. The contraction ring 70 in the forward groove 54 is disposed axially between the forward ring 58 and the first flange 46, with the forward ring 58 laterally abutting the aft face of the forward contraction ring 70, with the forward face of the contraction ring laterally abutting the crenelated first flange 46.

Whereas the aft contraction ring 70 in the aft groove 56 provides an aft seal for the aft expansion ring 58, the forward contraction ring 70 in the forward groove 54 provides a forward seal with the forward expansion ring 58 to suitably contain the pressurized air 16 surrounding the nozzle outer band.

Accordingly, FIGS. 10 and 11 illustrate a collective embodiment in which all four sealing flanges 46-52 are suitably crenelated for locally reducing the circumferential stiffness and rigidity of the outer band for in turn locally reducing stresses near the leading and trailing edges of the vanes. The forward groove 54 retains the first expansion ring 58 laterally trapped between the two crenelated forward and aft flanges 46,48 in the forward flange pair.

The aft groove 56 includes a second expansion ring 58 laterally retained between the crenelated forward and aft flanges 50,52 in the aft flange pair.

A first contraction ring 70 is disposed also in the forward groove 54 axially between the first expansion ring 58 and the crenelated first flange 46.

And, the second contraction ring 70 is also disposed in the aft groove 56 axially between the second expansion ring 58 and the crenelated fourth flange 52.

The full height crenels 66 are therefore used to particular advantage in the two inboard flanges 48,50 to axially retain the corresponding expansion rings 58 while substantially reducing structural rigidity of the outer band.

The short crenels 66 are effectively used in the scalloped first and fourth flanges 46,52 in cooperation with the corresponding contraction rings 70 for additionally reducing structural rigidity of the outer band while providing secondary sealing of the primary expansion rings 58 themselves.

As indicated above, the corresponding merlons 64 are preferably isolated from the nozzle vanes themselves and are preferably located equidistantly between the leading edges of adjacent vanes.

FIG. 11 illustrates that the corresponding merlons 64 of the aft two flanges 50,52 may also be isolated from the trailing edges of the adjacent vanes and preferably equidistantly therebetween. In this configuration, the aft merlons 64 of the aft two flanges 50,52 may be aligned with each other but circumferentially offset from the corresponding forward merlons 64 of the forward two flanges 46,48 which themselves may be axially aligned together.

In all of the embodiments disclosed above, crenelation of one or more of the sealing flanges not only reduces structural rigidity and stiffness of the outer band, but also reduces weight of the turbine nozzle which further improves the overall efficiency of the engine. The introduction of the secondary contraction ring 70 is offset in weight by the corresponding crenelation of the associated flanges.

The crenelated turbine nozzle disclosed above is effective for reducing otherwise locally high stresses where the vanes join the outer band for correspondingly increasing the useful life of the nozzle with relatively few modifications of the original nozzle design with the preferential elimination of flange material.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which:

1. A turbine nozzle comprising:
a circumferentially continuous outer band integrally joined to a row of nozzle vanes extending radially inwardly therefrom said vanes having axially opposite leading and trailing edges, and including forward and aft pairs of flanges extending radially outwardly, said flanges being arranged in a first, second, third, and fourth flange sequence between forward and aft ends of said outer band corresponding with said leading and trailing edges of said vanes; and
said second and said fourth flange each being crenelated circumferentially therearound with a row of merlons spaced circumferentially apart by corresponding crenels;
a first expansion seal ring disposed in a forward groove between said first and second flanges;
a second expansion seal ring disposed in an aft groove between said third and fourth flanges; and
a first contraction seal ring disposed also in said aft groove axially between said second ring and said crenelated fourth flange.

2. A nozzle according to claim 1 wherein said second flange is crenelated adjacent said leading edge.

3. A nozzle according to claim 2 wherein said merlons in said second flange are spaced circumferentially between corresponding pairs of said vanes.

4. A nozzle according to claim 3 wherein said fourth flange is crenelated adjacent said trailing edge.

5. A nozzle according to claim 4 wherein:
said merlons in said second flange begin at the outer surface of said outer band, and said crenels extend circumferentially along said outer surface between adjacent merlons; and
said fourth crenelated flange includes an annular base extending radially outwardly from said outer band, and said merlons therein extend radially outwardly from said base with said crenels extending circumferentially therebetween and above said base.

6. A nozzle according to claim 5 wherein said third flange is also crenelated.

7. A nozzle according to claim 5 wherein said first flange is also crenelated.

8. A nozzle according to claim 5 wherein:
said third flange is also crenelated with merlons beginning at said outer surface of said outer band and corresponding crenels extending circumferentially therebetween along said outer surface; and
said first flange is also crenelated and includes an annular base extending radially outwardly from said outer band with merlons extending radially outwardly from said base and corresponding crenels extending circumferentially therebetween along said base.

9. A nozzle according to claim 8 further comprising a second contraction seal ring disposed also in said forward groove axially between said first expansion ring and said crenelated first flange.

10. A turbine nozzle comprising:
circumferentially continuous annular outer and inner bands integrally joined to opposite radial ends of a row of nozzle vanes;
a pair of flanges extending radially outwardly from said outer band and spaced axially apart to define an annular seal groove;
one of said flanges being crenelated, wherein said crenelated flange comprises a row of merlons spaced circumferentially apart by corresponding crenels; and
at least one seal ring disposed in said seal groove.

11. A nozzle according to claim 10 wherein said merlons begin at the outer surface of said outer band, and said crenels extend circumferentially along said outer surface between adjacent merlons.

12. A nozzle according to claim 10 wherein said crenelated flange further comprises an annular base extending radially outwardly from said outer band, and said merlons extend radially outwardly from said base with said crenels extending circumferentially therebetween and above said base.

13. A nozzle according to claim 10 wherein said merlons match in quantity said row of vanes.

14. A nozzle according to claim 10 wherein said merlons are spaced circumferentially between corresponding pairs of said vanes.

15. A nozzle according to claim 10 wherein said at least one seal ring comprises an expansion ring extending radially outwardly from said groove and above said pair of flanges and spaced radially above said outer band.

16. A nozzle according to claim 10 wherein said at least one seal ring comprises a contraction ring abutting radially inwardly said outer band.

17. A nozzle according to claim 10 wherein said at least one seal ring comprises:
- an expansion seal ring extending radially outwardly from said groove above said pair of flanges, and spaced radially above said outer band;
- a contraction seal ring disposed in said seal groove laterally abutting said expansion ring and radially inwardly abutting said outer band; and
- said contraction ring laterally abuts said crenelated flange.

18. A nozzle according to claim 10 further comprising:
- a forward pair of first and second ones of said flanges extending radially outwardly from said outer band at a forward end thereof to define a forward annular seal groove;
- an aft pair of third and fourth ones of said flanges extending radially outwardly from said outer band at an aft end thereof to define an aft annular seal groove; and
- one of said four flanges is crenelated.

19. A nozzle according to claim 18 wherein:
- said vanes have axially opposite leading and trailing edges corresponding with said forward and aft ends of said outer band, and said first, second, third, and fourth flanges are arranged in downstream sequence between; and
- said second flange is crenelated.

20. A nozzle according to claim 19 wherein said fourth flange is also crenelated.

21. A nozzle according to claim 20 wherein:
- said forward groove includes an expansion ring; and
- said aft groove includes both an expansion ring and a laterally abutting contraction ring in turn laterally abutting said crenelated fourth flange.

22. A nozzle according to claim 21 wherein said third flange is also crenelated.

23. A nozzle according to claim 22 wherein:
- said merlons in said third flange begin at the outer surface of said outer band, and said crenels extend circumferentially along said outer surface between adjacent merlons; and
- said fourth flange includes an annular base extending radially outwardly from said outer band, and said merlons in said fourth flange extend radially outwardly from said base with said crenels extending circumferentially therebetween and above said base.

24. A nozzle according to claim 19 wherein said first flange is also crenelated.

25. A nozzle according to claim 24 wherein said forward groove includes both an expansion ring and a laterally abutting contraction ring in turn laterally abutting said crenelated first flange.

26. A nozzle according to claim 25 wherein:
- said merlons in said second flange begin at the outer surface of said outer band, and said crenels extend circumferentially along said outer surface between adjacent merlons; and
- said first flange includes an annular base extending radially outwardly from said outboard, and said merlons in said first flange extends radially outwardly from said base with said crenels extends circumferentially therebetween and above said base.

* * * * *